(12) United States Patent
König et al.

(10) Patent No.: US 6,262,219 B1
(45) Date of Patent: Jul. 17, 2001

(54) METHOD FOR PRODUCING POLYCARBONATE

(75) Inventors: Annett König, Krefeld; Uwe Hucks, Alpen; Claus-Ludolf Schultz; Günther Jeromin, both of Krefeld, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/446,852

(22) PCT Filed: Jun. 24, 1998

(86) PCT No.: PCT/EP98/03863

§ 371 Date: Dec. 28, 1999

§ 102(e) Date: Dec. 28, 1999

(87) PCT Pub. No.: WO99/02579

PCT Pub. Date: Jan. 21, 1999

(30) Foreign Application Priority Data

Jul. 5, 1997 (DE) ............................................. 197 28 805

(51) Int. Cl.$^7$ .............................. C08G 64/30; C08G 64/20
(52) U.S. Cl. ................................................................ 528/199
(58) Field of Search ............................................... 528/199

(56) References Cited

U.S. PATENT DOCUMENTS

| 4,346,210 | * | 8/1982 | Alewelt . | |
| 5,434,227 | | 7/1995 | Yamato et al. | ........................ 526/62 |

FOREIGN PATENT DOCUMENTS

| 000753 | * | 2/1979 | (EP) . |
| 708129 | * | 4/1996 | (EP) . |

* cited by examiner

*Primary Examiner*—David Buttner
(74) *Attorney, Agent, or Firm*—Joseph C. Gil; Aron Preis

(57) ABSTRACT

The present invention relates to a transesterification method for producing solvent-free polycarbonate, using N-alkyl-substituted piperidines or N-alkyl-substituted morpholines comprising $C_2$–$C_{12}$ N-alkyl substituents, preferably $C_2$–$C_8$ N-alkyl substituents, most preferably $C_2$–$C_5$ N-alkyl substituents, as catalysts.

4 Claims, No Drawings

METHOD FOR PRODUCING POLYCARBONATE

The present invention relates to the production of thermoplastic polycarbonates, by the known transesterification method in the melt, from diphenols, carboxylic acid diaryl esters and optionally branching agents and/or monophenols, at temperatures between 80 and 400° C. and at pressures between 1000 mbar and 0.01 mbar, with the use in conjunction with catalysts, which is characterised in that N-alkyl-substituted piperidines or N-alkyl-substituted morpholines comprising $C_2$–$C_{12}$ N-alkyl substituents, preferably $C_2$–$C_8$ N-alkyl substituents, and particularly $C_2$–$C_5$ N-alkyl substituents, are used as catalysts in amounts of $10^{-2}$ to $10^{-8}$ moles, preferably of $10^{-2}$ to $10^{-5}$ moles, per mole diphenol.

The preferred N-alkylpiperidines are N-ethylpiperidine, N-propylpiperidine and N-isopropylpiperidine. The preferred N-alkylmorpholines are N-ethylmorpholine, N-propylmorpholine and N-isopropylmorpholine.

These may be used on their own or in combination, together or in succession.

The melt transesterification method using N-containing catalysts is known from U.S. Pat. No. 5,434,227, wherein piperidine and N-methylmorpholine are cited (column 12, line 44).

Polycarbonates produced in this manner (comparative examples 1 and 2) are less thermally resistant and exhibit yellowing phenomena.

In contrast, the polycarbonates which are obtainable by the process according to the invention are distinguished by their light inherent colour and by high light transmission, even after long-term thermal loading. Moreover, they are substantially free from unwanted defects in the polycarbonate itself, and are naturally solvent-free.

In the sense of the process according to the present invention, the term "substantially free from unwanted defects in the polycarbonate" means that the content of branching agents of formula (I)

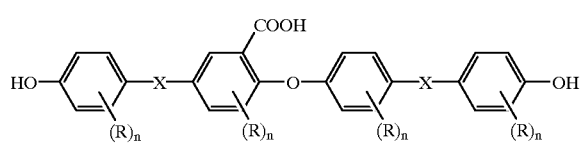

(I)

wherein

X=a $C_1$–$C_8$ alkylidene or cycloalkylidene, S or a single bond,
R=$CH_3$, Cl, or Br, and
n=0,1 or 2, in the polycarbonate has a value after complete saponification and determination by HPLC of not more than 300 ppm, preferably not more than 100 ppm.

Diphenols which are suitable for the production of the copolycarbonates used according to the invention are those of general formula (II)

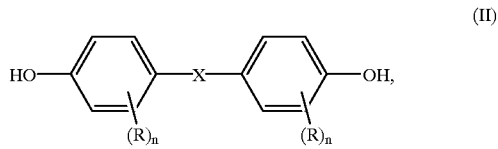

(II)

wherein
X, R and n have the same meaning as in formula (I).

Suitable diphenols are described, for example, in U.S. Pat. Nos. 3,028,365, 2,999,835, 3,062,781, 3,148,172 and 4,982,014, in DE-OS 1 570 703 and 2 063 050, and in the monograph by H. Schnell, "Chemistry and Physics of Polycarbonates", Interscience Publishers, New York, 1964.

Preferred diphenols include
4,4'-dihydroxyphenyl,
2,2-bis-(4-hydroxyphenyl)-propane,
2,4-bis-(4-hydroxyphenyl)-2-methylbutane,
1,1-bis-(4-hydroxyphenyl)-cyclohexane,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
2,4-bis-(3,5-dimethyl-4-hydroxyphenyl)-2-methylbutane,
1,1-bis-(3,5-dimethyl-4-hydroxyphenyl)-cyclohexane,
1,1-bis-(4-hydroxyphenyl)-3,3,5-trimethylcyclohexane,
1,1-bis-(4-hydroxyphenyl)-3-methylcyclohexane,
1,1-bis-(4-hydroxyphenyl)-3,3-dimethylcyclohexane,
1,1-bis-(4-hydroxyphenyl)-4-methylcyclohexane,
2,2-bis-(3,5-dichloro-4-hydroxyphenyl)-propane, and
2,2-bis-(3,5-dibromo-4-hydroxyphenyl)-propane.

Examples of particularly preferred diphenols include:
2,2-bis-(4-hydroxyphenyl)-propane,
2,2-bis-(3,5-dimethyl-4-hydroxyphenyl)-propane,
1,1-bis-(4-hydroxyphenyl)-cyclohexane,
1,1-bis-(4-hydroxyphenyl)-3,3,5-trimethylcyclohexane,
1,1-bis-(4-hydroxyphenyl)-3-methylcyclohexane.
2,2-bis-(4-hydroxyphenyl)-propane and 1,1-bis-(4-hydroxyphenyl)-3,3,5-trimethyl-cyclohexane are particularly preferred.

Any mixtures of the aforementioned diphenols can also be used.

The polycarbonates can be deliberately branched in a controlled manner by the use of small amounts of branching agents. Some suitable branching agents are: phloroglucin,
4,6-dimethyl-2,4,6-tri-(4-hydroxyphenyl)-heptene-2,
4,6-dimethyl-2,4,5-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis[4,4-bis-(4-hydroxyphenyl)-cyclohexyl-propane,
2,4-bis-(4-hydroxyphenyl-isopropyl)-phenol,
2,6-bis-(2-hydroxy-5'-methyl-benzyl)-4-methylphenol,
2-(4-hydroxyphenyl)-2-(2,4-dihydroxyphenyl)-propane,
hexa-(4-(4-hydroxyphenyl-isopropyl)-phenyl)-ortho-terephthalic acid ester,
tetra-(4-hydroxyphenyl)-methane,
tetra-(4-(4-hydroxyphenyl-isopropyl)phenoxy)-methane,
1,4-bis-((4',4"-dihydroxytriphenyl)-methyl)-benzene, and particularly
$\alpha,\alpha',\alpha''$-tris-(4-hydroxyphenyl)-1,3,5-triisopropylbenzene.

Other possible branching agents are:
2,-4-dihydroxybenzoic acid, trimesic acid,
trimesic acid trichloride,
cyanuric chloride, and
3,3-bis-(3-methyl-4-hydroxyphenyl)-2-oxo-2,3-dihydroindole.

The 0.05 to 2 mole %, with respect to the diphenols used, of branching agents which are optionally used in conjunction can be used together with the diphenols.

Carboxylic acid esters in the sense of the present invention are di-$C_6$–$C_{12}$ aryl esters, preferably the diesters of phenol or alkyl-substituted phenols, namely diphenyl carbonate or dicresyl carbonate for example. The carboxylic acid diesters are used in an amount of 1.01 to 1.30 moles, preferably 1.02 to 1.15 moles, with respect to 1 mole of bisphenol.

It should be ensured that the reaction components, namely the diphenols and the carboxylic acid diaryl esters, are as free as possible from alkali metal and alkaline earth metal ions. Pure carboxylic acid diaryl esters or diphenols of this type can be obtained by recrystallising, washing or distilling the carboxylic acid diaryl esters or diphenols. In the process according to the invention, the content of alkali metal and alkaline earth metal ions, both in the diphenol and in the carboxylic acid diaryl ester, should have a value of <0.01 ppm.

The production of the polycarbonate can be carried out in one step. The aromatic dihydroxy compounds and the carboxylic acid diesters are then reacted under the usual condensation polymerisation conditions known from the literature.

For example, these conditions comprise the melting of the aromatic dihydroxy compound and of the carboxylic acid diester at temperatures of 80° C. to 250° C., preferably 100 to 230° C., most preferably 120 to 190° C., under normal pressure, within 0.1 to 5 hours, preferably 0.25 to 3 hours. The catalysts according to the invention or combinations of the catalysts according to the invention can be added before melting or to the molten starting materials. An oligocarbonate is then produced from the aromatic dihydroxy compound and the carboxylic acid diester by distilling off the monophenol, by applying a vacuum and increasing the temperature. Following this, the polycarbonate is produced during the condensation polymerisation step by further increasing the temperature to 240 to 400° C. and by reducing the pressure to 0.01 mbar.

It may also be advantageous, however, to conduct the condensation polymerisation in two or more steps.

The oligocarbonates produced as the intermediate step in the course of this procedure have average molecular weights $M_w$ of 3000 to 24,000, preferably from 5000 to 20,000, as determined by measuring the relative solution viscosity in dichloromethane or in mixtures of equal amounts by weight of phenol/o-dichlorobenzene, which are calibrated by light scattering. The temperature for the production of these oligocarbonates is between 100 and 290° C., preferably between 150 and 280° C. The monophenols formed during the transesterification to produce the oligocarbonate are removed by applying a vacuum of 1 bar to 0.5 mbar, preferably <500 mbar to 1 mbar.

The polycarbonate is produced by condensation polymerisation of the oligocarbonate, optionally with a further addition of the catalysts according to the invention to the oligocarbonate, by further increasing the temperature to 230 to 400° C., preferably to 250 to 320° C., and at a pressure of <100 mbar to 0.01 mbar.

In the sense of the process according to the invention, the reaction of the aromatic dihydroxy compound and the carboxylic acid diester can be conducted continuously or batchwise, for example in stirred vessels, thin film evaporators, falling film evaporators, stirred vessel cascades, extruders, kneaders, simple plate reactors and high-viscosity plate reactors.

The aromatic polycarbonates of the process according to the invention should have weight average molecular weights of 18,000 to 60,000, preferably from 19,000 to 40,000, as determined by measuring the relative solution viscosity in dichloromethane or in mixtures of equal amounts by weight of phenol/o-dichlorobenzene, which are calibrated by light scattering.

In addition to their light inherent colour as mentioned above, the polycarbonates produced according to the invention preferably have a low terminal OH group content of <1200 ppm, are stable towards hydrolysis, and are distinguished, as mentioned above, by their long-term thermal stability.

Molecular weight regulators, such as alkylphenols (isooctylphenol, t-butylphenol, cumylphenol) for example, can be used in the known manner (EP 360 578) in order to limit the weight average molecular weights $M_w$ of the polymers.

Fillers and reinforcing substances can be admixed with the polycarbonates produced according to the invention, in order to modify the properties thereof Amongst others, the following adjuvant substances are suitable as such: stabilisers (e.g. UV, thermal and gamma ray stabilisers), anti-static agents, flow enhancers, demoulding agents, flame retardants, pigments, finely divided minerals and fibrous substances, e.g. alkyl and aryl phosphites, phosphates and phosphanes, low molecular weight carboxylic acid esters, halogen compounds, salts, chalk, quartz flour, and glass and carbon fibres.

Moreover, other polymers can also be admixed with the polycarbonates according to the invention, e.g. polyolefines, polyurethanes, polystyrene.

These substances are preferably added to the finished polycarbonate in conventional processing units, but can be added, depending on the requirements, in another step of the process according to the invention.

Moreover, it is also possible to modify the polycarbonates for special applications by the incorporation of blocks, segments and comonomers by condensation, e.g. silane blocks comprising terminal OH groups, aromatic and aliphatic polyesters comprising terminal OH and carboxylic acid groups, polyphenylene sulphide blocks comprising terminal OH groups, or polyphenylene oxide blocks comprising terminal OH groups.

The polycarbonates which are obtainable according to the invention can be processed in the known manner and on known machines to form any desired mouldings.

The polycarbonates which are produced according to the invention can be used commercially for the usual areas of application, i.e. in electronics, in the building sector and in motor vehicle construction, namely for example as a support material for data storage media, for ribbed panels for covering purposes, or as a housing material for electronic appliances.

EXAMPLES

Comparative example 0

114.15 g (0.500 moles) bisphenol A and 113.45 g (0.530 moles) diphenyl carbonate were weighed into a 500 ml three-necked flask fitted with a stirrer, internal thermometer and a Vigreaux column (30 cm, metal-coated) and bridge. The apparatus was freed from atmospheric oxygen by applying a vacuum and flushing with nitrogen (3 times), and the mixture was heated to 150° C. The resulting phenol was distilled off at 100 mbar. At the same time, the temperature was increased to 250° C. After 1 hour, the vacuum was enhanced to 10 mbar. Condensation polymerisation was effected by reducing the vacuum to 0.5 mbar and increasing the temperature to 280° C. A solvent-free polycarbonate was obtained, which had a relative solution viscosity of 1.193 (dichloromethane, 25° C., 5 g/l). The content of branching agents of formula (I) in the polycarbonate produced was 12 ppm. The phenolic OH value of the polycarbonate was 980 ppm.

Comparative example 1

114.15 g (0.500 moles) bisphenol A and 113.45 g (0.530 moles) diphenyl carbonate were weighed into a 500 ml three-necked flask fitted with a stirrer, internal thermometer and a Vigreaux column (30 cm, metal-coated) and bridge. The apparatus was freed from atmospheric oxygen by applying a vacuum and flushing with nitrogen (3 times), and the mixture was heated to 150° C. 0.125 µl ($5*10^4$ mole %) piperidine, with respect to bisphenol A, was then added and the resulting phenol was distilled off at 100 mbar. At the same time, the temperature was increased to 250° C. After 1 hour, the vacuum was enhanced to 10 mbar. Condensation polymerisation was effected by reducing the vacuum to 0.5 mbar and increasing the temperature to 280° C. A solvent-free polycarbonate was obtained, which had a relative solution viscosity of 1.201 (dichloromethane, 25° C., 5 g/l). The content of branching agents of formula (I) in the polycarbonate produced was 15 ppm. The phenolic OH value of the polycarbonate was 870 ppm.

Comparative example 2

The procedure was as in comparative example 1, except that 1.97 µl ($4*10^{-3}$ mole %) piperidine were used. A solvent-free polycarbonate was obtained, which had a relative solution viscosity of 1.204 (dichloromethane, 25° C., 5 g/l). The content of branching agents of formula (1) in the polycarbonate produced was 10 ppm. The phenolic OH value of the polycarbonate was 890 ppm.

Example 1

114.15 g (0.500 moles) bisphenol A and 113.45 g (0.530 moles) diphenyl carbonate were weighed into a 500 ml three-necked flask fitted with a stirrer, internal thermometer and a Vigreaux column (30 cm, metal-coated) and bridge. The apparatus was freed from atmospheric oxygen by applying a vacuum and flushing with nitrogen (3 times), and the mixture was heated to 150° C. 0.34 µl ($5*10^{-4}$ mole %) N-ethylpiperidine, with respect to bisphenol A, was then added and the resulting phenol was distilled off at 100 mbar. At the same time, the temperature was increased to 250° C. After 1 hour, the vacuum was enhanced to 10 mbar. Condensation polymerisation was effected by reducing the vacuum to 0.5 mbar and increasing the temperature to 280° C. A solvent-free polycarbonate was obtained, which had a relative solution viscosity of 1.285 (dichloromethane, 25° C., 5 g/l). The content of branching agents of formula (I) in the polycarbonate produced was 20 ppm. The phenolic OH value of the polycarbonate was 240 ppm.

Example 2

The procedure was as in example 1, except that 2.74 µl ($4*10^{-3}$ mole %) N-ethylpiperidine were used. A colourless, solvent-free polycarbonate was obtained, which had a relative solution viscosity of 1.260 (dichloromethane, 25° C., 5 g/l). The content of branching agents of formula (1) in the polycarbonate produced was 6 ppm. The phenolic OH value of the polycarbonate was 290 ppm.

Example 3

The procedure was as in example 2, except that the batch was polymerised for 1.5 hours at 300° C. in the final step of the condensation polymerisation. A light-coloured, solvent-free polycarbonate was obtained, which had a relative solution viscosity of 1.299 (dichloromethane, 25° C., 5 g/l). The content of branching agents of formula (I) in the polycarbonate produced was 10 ppm. The phenolic OH value of the polycarbonate was 280 ppm.

Example 4

The procedure was as in example 1, except that $4*10^{-3}$ mole % N-propylpiperidine was used as the catalyst. A solvent-free polycarbonate was obtained, which had a relative solution viscosity of 1.264 (dichloromethane, 25° C., 5 g/l). The content of branching agents of formula (1) in the polycarbonate produced was 13 ppm. The phenolic OH value of the polycarbonate was 340 ppm.

Example 5

The procedure was as in example 1, except that $4*10^{-3}$ mole % N-ethylmorpholine was used as the catalyst A solvent-free polycarbonate was obtained, which had a relative solution viscosity of 1.259 (dichloromethane, 25° C., 5 g/l). The content of branching agents of formula (1) in the polycarbonate produced was 5 ppm. The phenolic OH value of the polycarbonate was 330 ppm.

Example 6

The procedure was as in example 1, except that $4*10^{-3}$ mole % N-propylmorpholine was used as the catalyst. A solvent-free polycarbonate was obtained, which had a relative 5 solution viscosity of 1.259 (dichloromethane, 25° C., 5 g/l). The content of branching agents of formula (1) in the polycarbonate produced was 5 ppm. The phenolic OH value of the polycarbonate was 330 ppm.

| | Light transmission at 420 nm, layer thickness 4 mm, annealing at 140° C. | | | |
|---|---|---|---|---|
| Example | 0 days | 7 days | 14 days | 21 days |
| 1 (comparative) | 83 | 82.5 | 82.2 | 81.3 |
| 2 (comparative) | 83.5 | 82.9 | 81.7 | 81.0 |
| 1 | 86.2 | 85.6 | 85.3 | 85.1 |
| 2 | 85.6 | 85.0 | 84.8 | 84.7 |
| 3 | 86 | 85.8 | 85.3 | 85.1 |
| 4 | 85.3 | 84.9 | 84.5 | 83.8 |

-continued

| | Light transmission at 420 nm, layer thickness 4 mm, annealing at 140° C. | | | |
|---|---|---|---|---|
| Example | 0 days | 7 days | 14 days | 21 days |
| 5 | 85.8 | 85.2 | 84.5 | 84.1 |
| 6 | 85.5 | 85.0 | 84.7 | 83.9 |

What is claimed is:

1. A process for producing thermoplastic polycarbonates, by the known transesterification method in the melt, from diphenols, carboxylic acid diaryl esters and optionally branching agents and/or monophenols, at temperatures between 80 and 400° C. and at pressures between 1000 mbar and 0.01 mbar, with the use in conjunction with catalysts, characterised in that N-alkyl-substituted piperidines or N-alkyl-substituted morpholines comprising $C_2$–$C_{12}$ N-alkyl substituents are used as catalysts in amounts of $10^{-2}$ to $10^{-8}$ moles per mole diphenol.

2. A process according to claim 1, characterised in that catalysts comprising $C_2$–$C_8$ N-alkyl substituents are used as catalysts.

3. A process according to claim 1, characterised in that catalysts comprising $C_2$–$C_5$ N-alkyl substituents are used as catalysts.

4. A process according to claim 1 for producing polycarbonates having a content of branching agent structure of formula (I)

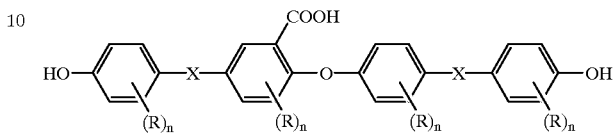

of not more than 300 ppm in the polycarbonate, after complete saponification and determination by HPLC.

* * * * *